May 17, 1960     F. J. SANTAPA     2,937,039
CONTROLLED GAP SEAL
Filed May 29, 1957

INVENTOR.
Frank J. Santapa,
BY
Cromwell, Greist & Warden
Attys.

United States Patent Office 2,937,039
Patented May 17, 1960

2,937,039

CONTROLLED GAP SEAL

Frank J. Santapa, Chicago, Ill., assignor to Chicago Rawhide Manufacturing Company, Chicago, Ill., a corporation of Illinois Application May 29, 1957, Serial No. 662,512

13 Claims. (Cl. 286—11.15)

The present invention relates to a new and improved form of seal which utilizes the principle of controlled gap operation whereby a sealing member is initially mounted in spaced relation to a surface to be sealed and the space or gap, which is of a very small fraction of an inch, is maintained by reason of the modified thermo-expansivity of the material of the sealing member.

Controlled gap seals of the type disclosed in the co-pending application, Serial No. 527,026, filed August 8, 1955, are of particular utility in providing efficient sealing action during high temperature, high speed operation of various devices such as jet engines. The sealing ring, which is mounted relative to a shaft, must be formed from a material, such as carbon, capable of withstanding the extreme high speed, high temperature conditions over extended periods of operation. A sealing ring formed from carbon is not only capable of withstanding the high temperatures encountered but is further quite wear-resistant. Carbon, as is true of many high temperature resistant materials, is substantially non-flexible and furthermore exhibits a fairly low rate of thermal expansion in response to changing temperature conditions. As a result, sealing rings of circumferentially continuous form made from carbon for use on a high speed steel shaft under relatively high temperature conditions, expand at a slower rate than the rate of expansion of the shaft in response to increasing operational temperatures. Under these conditions a carbon ring will ultimately become frozen to the shaft.

The type of seal disclosed in the aforementioned co-pending application utilizes a carbon sealing ring provided with an inner diameter which is slightly greater than the diameter of the shaft to establish a minute space or gap circumferentially therebetween. The carbon ring is compressibly held by an outer metallic ring which is shrunk-fitted onto the outer periphery of the carbon ring to an extent necessary to modify the thermo-expansivity characteristics of the carbon ring and increase the rate of expansion thereof to an extent that the minute gap or clearance between the ring and the shaft is maintained during and following a substantial increase in shaft temperature. As the shaft temperature increases and the shaft expands, the metallic ring, which may be formed from the same material as that of the shaft, also expands at at least substantially the same rate or greater and to at least substantially the same extent. Expansion of the compression ring permits the pre-compressed carbon of the sealing ring to expand toward its uncompressed state with the result that the inside diameter of the carbon ring will increase in size sufficiently to maintain the predetermined operative clearance between the ring and the shaft. The carbon, due to being in a compressed state, expands in response to the thermal expansion of the compression ring at a measurable rate of expansion which is greater than its inherent thermal rate of expansion. By selectively choosing the materials forming the sealing ring and the compression ring, the rate of expansion of the sealing ring under varying temperature conditions can be controlled to an extent that the gap or radial clearance existing between the sealing ring and the shaft remains substantially constant during high speed operation of the shaft, which operation is accompanied by a substantial temperature rise.

A typical installation for which a controlled gap seal of the type described is especially suitable, involves the application of the seal to protect the rear compressor bearing of a jet engine from loss of lubricant during high temperature and high velocity jet engine operation. The rotative speeds involved in various aspects of jet engine operation may range from about 3000 r.p.m. to about 75000 r.p.m. The pressure differential may be in the neighborhood of as high as 150 lbs. per square inch and the operating temperature may fall in a range up to 1000° F. These are obviously conditions of the most severely trying sort to protect against, but they must be met and overcome, and they can be successfully handled by the improved seals of the present invention.

Where a composite controlled gap sealing ring of the type described is mounted about the periphery of a shaft for sealing action directly therewith, it has been found difficult to consistently obtain a predetermined gap which, for example, will range from about 0.0005 to 0.003 of an inch due to slight variations in the diameter of the shaft. It has been found that shaft diameters will vary slightly throughout the length thereof and in order to provide controlled gap sealing action along any given portion of the shaft, it is necessary that the composite sealing ring be provided with an inside diameter measured to the particular diameter of the shaft at the point of sealing action. Under these circumstances it may be necessary to provide undersized composite sealing rings, the inner diameters of which are enlarged just immediately prior to installation in order to provide the proper gap between the ring and the particular shaft area which is to be placed under seal. This, of course, is undesirable in that it not only increases the cost of installation of a controlled gap sealing unit, but it further reduces the utility of any single unit which has been modified for mounting on a given area of a given shaft.

A further problem in connection with the use of a composite sealing ring designed for mounting in direct sealing relation with the periphery of the shaft arises from variations in shaft thermal coefficients of expansion. The composition of one shaft may vary sufficiently from that of another to establish different thermal coefficients of expansion and in order for the controlled gap sealing unit to operate at substantially maximum efficiency, the modified thermal coefficient of expansion of the seal must be substantially equal to that of the shaft. Still further, with any given shaft, the composition of the same may vary sufficiently throughout the length thereof so as to provide inherent variations in thermal coefficients of expansion. Under these circumstances, mass production of controlled gap seals is difficult where it is desired to initially establish and maintain a predetermined clearance of operation.

It is an object of the present invention to provide new and improved forms of controlled gap seals wherein improved gap control is obtained adapting the seals for use with different shafts of varying composition or slight variations in shaft diameter.

Another object is to provide a controlled gap seal structure which incorporates therein a shaft-like sleeve arranged for controlled gap sealing relation with a composite sealing member, the shaft-like sleeve functioning as a false or substitute shaft with the operational temperatures of the sleeve more nearly equalling the operational temperatures of the composite sealing ring thereby providing improved gap control therebetween.

Still a further object is to provide new and improved forms of controlled gap seals which utilize a shaft-like sleeve forming a part thereof for controlled gap sealing relation with a composite sealing ring, the self-contained unit formed thereby being adapted not only for mounting on a shaft but further being susceptible to mounting in a shaft housing relative to a shaft, one form of the improved seal having provisions for including a self-contained mating ring therein for end face sealing action with the composite sealing ring.

Other objects not specifically set forth will become apparent from the following detailed description made in conjunction with the drawings wherein.

Figure 1:
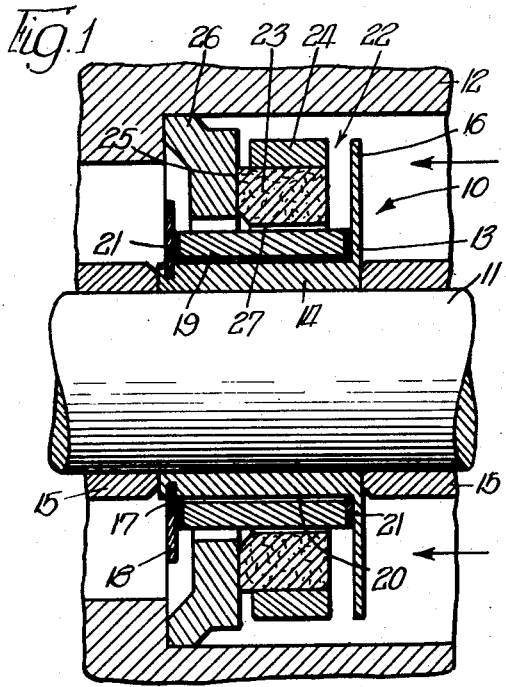
Fig. 1 is a fragmentary vertical section of one form of improved controlled gap seal of the present invention.

In Fig. 1 a controlled gap sealing unit 10 is illustrated mounted about a shaft 11 located within a shaft housing 12. The seal 10 includes an annular retainer 13 provided with an axially extending thick sleeve-like portion 14 which is received about the shaft 11 and fixed thereto between annular spacers 15. The retainer 13 is provided at one axial end thereof with a radially directed wall portion 16 and at the other end thereof with a circumferential groove 17. The groove 17 has received therein a ring or washer 18 which in combination with the wall portion 16 confines an annular sleeve 19 therebetween. The inner diameter of the sleeve 19 is greater than the outer diameter of the sleeve portion 14 so as to be initially received in spaced relation therewith to define a clearance 20. The opposite ends of the sleeve 19 each have associated therewith a compressible gasket 21, which may be of any suitable material, to seal the ends of the sleeve 19 within the retainer 13 and yet allow radial and axial expansion of the sleeve 19 in response to an increase in temperature during operation of the seal without interference from the wall portion 16 and ring 18. The gaskets 21 may be formed from soft metal such as copper capable of withstanding high temperatures and providing the desired function.

Received within the retainer 13 and mounted about the outer surface of the sleeve 19 is a composite sealing unit 22 which includes an inner ring 23 of heat resistant material held in compression by an outer metallic ring 24. For purposes of explanation, the material of the ring 23 will be referred to as carbon, it being understood that any suitable material may be used. The carbon ring 23 is block-like in cross section and is provided with an end face sealing surface 25 which is in sealing engagement with a mating ring 26 suitably held in fixed relation within the shaft housing 12.

The inner diameter of the carbon ring 23 is greater than the outer diameter of the sleeve 19 so as to provide a gap or clearance 27 therebetween which constitutes the controlled gap of the type previously described. The ring 18 is of adequate radial width to overlap the inner end of the mating ring 26 to provide a self-contained controlled gap seal 10.

Upon installation of the self-contained unit 10, the retainer 13 is fixed to the shaft 11 between the spacers 15 for rotation with the shaft 11. The sleeve 19 which constitutes a built-in shaft or false shaft forming a part of the seal 10 is fixedly carried by the retainer 13 for rotation with the shaft 11. The mating ring 26 may be pressure fitted into the shaft housing 12 or may be provided with a slightly smaller outer diameter to provide a slight slip-fit which eventually becomes tight as a result of heat expansion of the ring 26 within the shaft housing 12. Not only will heat expansion function to wedge the mating ring against rotation with the shaft 11 but operational fluid pressure will also function to hold the same in tight fixed relation with the shaft housing 12.

Upon operation of the shaft, the temperature of the same will rise and the shaft will expand in a known manner. The spacers 15, retainer 13 and sleeve 19 are preferably formed from the same material as the shaft 11, or at least from sufficiently similar material, to provide for substantially equal thermal expansion. By providing the gap 20, precaution is taken against breaking of the sleeve 19 by heat expansion of the fixed sleeve portion 14 of the retainer 13. As previously described, endwise expansion of the sleeve 19 compresses the gaskets 21 to provide a tight seal between the sleeve 19, radial wall portion 16 and ring 18. The compressive flexibility of the gaskets 21 allow the sleeve 19 to expand without damage to the same.

The compression ring 24 may be formed from the same material as that of the sleeve 19 in order to exhibit at least approximately the same thermal coefficient of expansion. Under these circumstances the composite sealing ring 22 will be provided with an over-all thermal coefficient of expansion somewhat less than that of the sleeve 19. The compression ring 24 may be formed from a material having a heat expansion rate which is greater than that of the sleeve 19. If so, the composite ring 22 will expand accordingly and by proper selection of material from which the ring 24 is formed, an over-all rate of expansion of the sealing ring 22 which is at least substantially equal to or greater than that of the sleeve 19 can be obtained. The ring 24 is shrunk-fitted onto the carbon ring 23 during the formation of the composite sealing ring 22 in the known manner to modify the thermal expansion properties of the carbon ring 23. These properties are preferably modified sufficiently to provide for substantially equivalent expansion of the composite sealing ring 22 relative to the sleeve 19 to maintain the clearance or gap 27 during high temperature operation of the shaft 11. The direction of high pressure fluid flow is indicated by the arrows in Fig. 1 and this fluid pressure acts on the exposed side surface of the composite sealing ring 22 to urge the same into end face sealing engagement at the opposite side thereof with the mating ring 26. In this manner adequate sealing action is provided during rotation of the shaft 11.

During operation of the seal 10, the composite sealing ring 22 will normally locate itself in concentric relation with the sleeve 19 upon high speed rotation thereof by reason of the composite ring being freely rotatable relative thereto. This ring is free to move radially to the very limited extent of its small clearance relative to the sleeve 19 so that in some phases of operation the composite sealing ring 22 may be eccentrically positioned on the sleeve 19. However, sealing efficiency is substantially the same whether the composite sealing ring 22 is concentrically or eccentrically located relative to the sleeve. Regardless of the speed of operation of the shaft 11, the lubricating oil or high pressure fluid is effectively sealed. It will be appreciated that at high speeds the carbon ring 23 is subjected to very substantial centrifugal forces and that the metallic ring 24 will effectively protect the ring 23 from disintegration by its confining action. This is another particularly important advantage arising from the structural arrangement as it is often the case that where carbon rings are used, particular care must be taken to prevent disintegration of the same.

The seal 10 is particularly effective during high speed, high temperature operation of the shaft 11. The radial clearance maintained between the composite sealing ring 22 and the sleeve 19 provides an orbital and axial flow of fluid along the shaft through the seal. This flow is nothing more than a slight leakage of fluid and can be used to prevent a reverse flow of a lubricating liquid into the air stream of a jet engine when the seal is used in this particular environment. The provision of the false shaft or sleeve 19 is of particular importance in connection with improved functioning of the seal 10 of the present invention. With the spacing of the sleeve 19 out of direct contact with the shaft 11, the temperature of the same more nearly equals the temperature of the composite sealing ring 22. Consequently, a more effective control of the gap 27 is provided with the elements defining the gap being maintained at substantially equal temperatures.

The use of the sleeve 19 not only provides better gap control during high temperature operation of the shaft 11, but additionally allows mass production of controlled gap seals which may be readily used in any installation regardless of the variations in shaft diameter which may exist. The retainer 13 is provided with an inside diameter which may or may not be tightly received about the shaft 11. If the inside diameter of the retainer 13 is slightly less than any given portion of the shaft 11, the same may be force-fitted thereon without losing effectiveness of the controlled gap sealing action. Normally, the retainer 13 is fixedly held on the shaft 11 by the sleeves 15 which positively clamp the same.

The outer diameter of the sleeve 19 and the inner diameter of the composite sealing ring 22 may be manufactured within specific tolerances to at all times provide the required gap therebetween regardless of dimensional variations in different types of installations. In this manner the size of the gap can be very effectively controlled and variations in the same will not occur as a result of variations in shaft diameter. In other words, a predetermined gap 27 can be provided during manufacture of the seal 10 and this gap will remain constant upon installation of the seal 10 as it is completely independent of shaft dimensions.

In connection with the last mentioned advantage of the structural features of the seal 10, it is often the case that shaft expansion cannot be readily predicted and where a composite sealing ring is mounted for direct sealing action with the periphery of the shaft, unexpected shaft expansion characteristics may either close the gap or enlarge the same to an extent that inefficient sealing action results. With the improved seal structure described including the use of the sleeve 19, little consideration need be given to variations in expansion characteristics of different shafts or even of a single shaft throughout the length thereof. The gap 27 is predetermined during manufacture of the elements forming the same and this gap will remain adequately constant upon installation and use.

Figure 2:
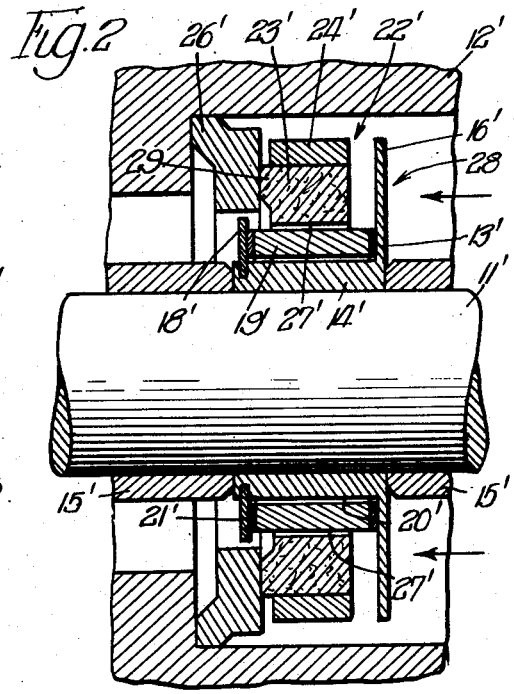
Fig. 2 is a modified form of improved controlled gap seal structure.

Fig. 2 illustrates a slightly modified controlled gap seal 28 which does not make use of the self-contained feature insofar as the mating ring is concerned. In each respect, except in connection with those to be specified, the seal 28 includes structural features which are identical with those of the seal 10 and for this reason primed reference numerals identify similar parts. The main portion of the seal 28 is of less axial length than the seal 10 inasmuch as the seal 28 is not designed to contain the mating ring 26'. Consequently, the fixed sleeve portion 14' of the retainer 13' and the sleeve 19' are of reduced axial length with the ring 18' being of reduced radial width to be readily received inwardly of the mating ring 26'. The carbon ring 23' is provided with a side seal nose portion 29 for side sealing engagement with the mating ring 26'. In all other respects, the seal 28 is identical with the seal 10 and functions in the same manner.

Figure 3:
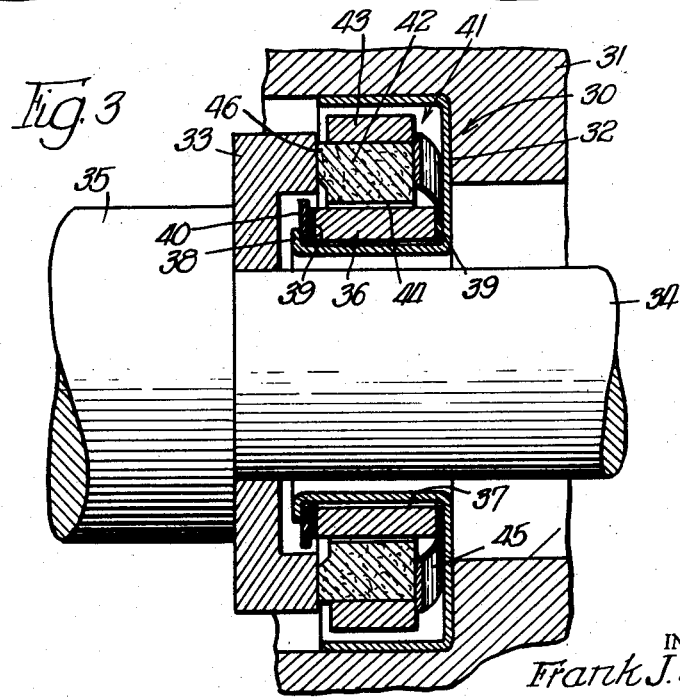
Fig. 3 is still a further modification of the improved form of controlled gap seal of the present invention.

Fig. 3 illustrates a further modified form of controlled gap sealing unit 30 which, while incorporating the basic principles of the present invention, is designed for fixed mounting relation with a shaft housing 31. The seal 30 is provided with a retainer housing 32 press-fitted into an enlarged portion in the shaft housing 31. The retainer housing 32 is of generally U-shape cross section being formed from integrally connected top wall, side wall and bottom wall portions. One side portion of the retainer housing 32 is open for receiving therein the sealing face portion of a mating ring 33 which is fixed to a shaft 34 provided with an enlarged portion 35.

The retainer housing 32 has received therein a sleeve 36 initially mounted in spaced relation to the inner surface of the bottom wall portion of the housing 32. A clearance 37 is thus provided between the inner periphery of the sleeve 36 and the outer periphery of the bottom wall portion of the housing 32, the gap 37 being identical in function as the gap 20 previously described. The free end of the bottom wall portion of the housing 32 is provided with a radially rolled flange 38 which contains within the housing the sleeve 36, the sleeve compressible end gaskets 39 and a retaining ring in the form of a washer 40. Received within the housing 32 about the outer periphery of the sleeve 36 is a composite sealing ring 41 of the type previously described being formed from an inner carbon ring 42 and an outer metallic ring 43, the latter ring holding the carbon ring 42 in compression to modify its thermo-expansivity characteristics. The inner diameter of the carbon ring 42 is greater than the outer diameter of the sleeve 36 to provide a predetermined clearance or gap 44 which constitutes the controlled gap feature of operation of the seal 30.

The inner surface of the side wall portion of the retainer housing 32 confines a wave spring 45 which is in resilient engagement with the adjacent side surface of the composite sealing ring 41. The spring 45 resiliently urges the sealing ring 41 into opposite end face sealing engagement with the mating ring 33, the opposite side of the carbon ring 42 being provided with a sealing nose 46 to establish a running seal with the mating ring 33. The spring 45 is used where the composite sealing ring 41 must be resiliently urged in a direction opposite to the flow of pressurized fluid, the strength of the spring 45 being adequate to overcome the fluid pressure of the system. In this connection, it will be noted that a similar spring or spring-like means may be mounted in the same manner in the seals 10 and 28.

The seal 30 functions in exactly the same manner as previously described with the exception that the retainer housing 32 is held stationary relative to the shaft 34 and the mating ring 33 rotates with the shaft 34. From the structural arrangement illustrated in Fig. 3, it will be noted that with the provision of the sleeve 36 and composite sealing ring 41 in spaced relation to the shaft 34, the operational temperatures of the same will be at least substantially equal. The sleeve 36 constitutes a false shaft or independent shaft forming a part of the seal 30 thus providing the seal 30 with all of the manufacturing, installation and operational advantages previously described.

Obviously many modifications and variations of the invention as hereinbefore set forth may be made without departing from the spirit and scope thereof, and therefore only such limitations should be imposed as are indicated in the appended claims.

I claim:

1. A seal including an annular retainer for shaft seal mounting, a sleeve suitably held by said retainer in radially spaced relation thereto for spacing thereby relative to said shaft, and a sealing ring of controlled thermal expansion properties on said sleeve in controlled gap sealing relation therewith.

2. A controlled gap seal including an annular retainer for shaft seal mounting, a sleeve suitably held by said retainer in radially spaced relation thereto for spacing thereby relative to said shaft, and a composite sealing ring of controlled thermal expansion properties on said sleeve in controlled spaced relation thereto, said composite sealing ring having a side sealing surface in engagement with a mating ring forming a part of said seal.

3. A controlled gap seal including an annular retainer for shaft seal mounting, a sleeve suitably held by said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion substantially equal to that of the sleeve.

4. A controlled gap seal including an annular retainer for shaft seal mounting, a sleeve suitably held on said retainer for spacing thereby relative to said shaft, and a composite sealing ring of controlled thermal expansion properties on said sleeve in controlled spaced relation thereto, said composite sealing ring having a modified and composite thermal expansivity characteristic by reason of being composed of a rigid carbon sealing ring having a metallic constricting ring banded under substantial internal tension about the same, said constricting ring compressing the carbon of said sealing ring which compression serves to increase the rate of expansion of said sealing ring to at least substantially equal the rate of thermal expansion of said sleeve.

5. A controlled gap seal including an annular retainer for clamping onto a shaft for rotation therewith, a sleeve suitably held on said retainer for spacing thereby relative to said shaft, and a composite sealing ring of controlled thermal expansion properties on said sleeve in controlled spaced relation thereto, said composite sealing ring including an inner ring of carbon material and an outer ring of the same material as that of the sleeve holding said inner ring in a state of compression.

6. A controlled gap seal including an annular retainer for clamping onto a shaft for rotation therewith, a sleeve suitably held on said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion substantially equal to that of the sleeve, said retainer including a relatively thick sleeve portion received about said shaft and carrying axially spaced radially directed sleeve retaining portions one of which is removable, the initial assembly of said seal providing for a gap between said sleeve and the thick sleeve portion of said retainer.

7. A controlled gap seal including an annular retainer for clamping onto a shaft for rotation therewith, a sleeve suitably held on said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion at least substantially equal to that of the sleeve, said retainer including a relatively thick sleeve portion received about said shaft and carrying axially spaced radially directed sleeve retaining portions, compressible gaskets intermediate the ends of said sleeve and said retainer to allow expansion of said sleeve therein and seal said sleeve relative to said retainer, the initial assembly of said seal providing for a gap between said sleeve and the thick sleeve portion of said retainer.

8. A controlled gap seal including an annular retainer for clamping onto a shaft for rotation therewith, a sleeve suitably held on said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion at least substantially equal to that of the sleeve, said retainer including a relatively thick sleeve portion received about said shaft and carrying axially spaced radially directed sleeve retaining portions, compressible gaskets intermediate the ends of said sleeve and said retainer to allow axial expansion of said sleeve therein and seal said sleeve relative to said retainer, the initial assembly of said seal providing for a gap between said sleeve and the thick sleeve portion of said retainer, said composite sealing ring having a side sealing surface in engagement with a mating ring forming a part of said seal, said mating ring being retained on said seal by one of the sleeve retaining portions of said retainer.

9. A controlled gap sealing unit carried by a rotatable shaft in a shaft housing, an annular retainer held on said shaft between spaced collars affixed thereto, a sleeve suitably held on said retainer for spacing thereby relative to said shaft, a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion at least substantially equal to that of the sleeve, compressible gaskets intermediate the ends of said sleeve and said retainer to allow expansion of said sleeve within said retainer and seal said sleeve relative thereto, the initial assembly of said seal providing for a gap between said sleeve and said retainer, said composite sealing ring having a side sealing surface in engagement with the mating ring forming a part of said seal and carried by said shaft housing, and resilient means carried by said retainer in contact with said composite sealing ring urging the same in side sealing relation with said mating ring.

10. A controlled gap seal including an annular retainer fixedly carried in a housing surrounding a shaft, a sleeve suitably held by said retainer for spacing thereby relative to said shaft, and a composite sealing ring of controlled thermal expansion properties on said sleeve in controlled spaced relation thereto, said composite sealing ring having a side sealing surface in engagement with a mating ring forming a part of said seal and carried by said shaft for rotation therewith.

11. A controlled gap seal including an annular retainer fixedly carried in a housing surrounding a shaft, a sleeve suitably held on said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion substantially equal to that of the sleeve, said retainer being in the form of a housing open at one end thereof to receive therein said sleeve, a radial edge of said retainer housing holding said sleeve therein, compressible gaskets intermediate the ends of said sleeve and said retainer housing to allow expansion of said sleeve therein and seal said sleeve relative to said retainer housing, the initial assembly of said seal providing for a gap between said sleeve and said retainer housing, said composite sealing ring having a side sealing surface in engagement with a mating ring forming a part of said seal and carried by said shaft for rotation therewith.

12. A controlled gap seal including an annular retainer fixedly carried in a housing surrounding a shaft, a sleeve suitably held on said retainer for spacing thereby relative to said shaft, and a composite sealing ring of controlled thermal expansion properties on said sleeve in controlled spaced relation thereto, said composite sealing ring including an inner ring of high temperature resistant material and an outer ring holding said inner ring in a state of compression, the material of said inner ring having a thermal coefficient of expansion less than that of the sleeve, the material of said outer ring having a thermal coefficient of expansion substantially equal to that of the sleeve, said retainer being in the form of a housing open at one end thereof to receive therein said sleeve, a radial edge of said retainer housing holding said sleeve therein, compressible gaskets intermediate the ends of said sleeve and said retainer housing to allow axial and radial expansion of said sleeve therein and seal said sleeve relative to said retainer housing, the initial assembly of said seal providing for a gap between said sleeve and said retainer housing, said composite sealing ring having a side sealing surface in engagement with a mating ring forming a part of said seal and carried by said shaft for rotation therewith, and resilient means carried by said retainer housing in contact with said composite sealing ring urging the same into side sealing relation with said mating ring.

13. A controlled gap seal including an annular false shaft for mounting about a main shaft to be sealed, false shaft mounting means to mount the same about said main shaft in circumferentially continuous radially spaced relation thereto, and a composite sealing ring of controlled thermal expansion properties on said false shaft in controlled spaced relation thereto, said composite sealing ring including an inner ring of high temperature resistant material and an outer ring holding said inner ring in a state of compression, the material of said inner ring having a thermal coefficient of expansion less than that of the false shaft, the material of said outer ring having a thermal coefficient of expansion substantially equal to that of the false shaft.

References Cited in the file of this patent

UNITED STATES PATENTS

| | | |
|---|---|---|
| 1,643,809 | Fry | Sept. 27, 1927 |
| 1,857,961 | Lamb | May 10, 1932 |
| 2,149,524 | Huhn | Mar. 7, 1939 |
| 2,464,989 | Payne | Mar. 22, 1949 |
| 2,543,615 | Trumpler | Feb. 27, 1951 |
| 2,600,991 | Hargrove | June 17, 1952 |